United States Patent [19]

Accad

[11] Patent Number: 5,553,200
[45] Date of Patent: Sep. 3, 1996

[54] METHOD AND APPARATUS FOR PROVIDING BIT-RATE REDUCTION AND RECONSTRUCTION OF IMAGE DATA USING DITHER ARRAYS

[75] Inventor: Yigal Accad, Millbrae, Calif.

[73] Assignee: Electronics For Imaging, Inc., San Mateo, Calif.

[21] Appl. No.: 398,369

[22] Filed: Mar. 3, 1995

[51] Int. Cl.[6] ............................ H04N 1/405; H04N 1/413
[52] U.S. Cl. ............................ 395/109; 395/114; 358/457; 358/429
[58] Field of Search ...................................... 395/109, 114; 358/457, 429, 426, 456, 466, 465; 382/244, 237, 270, 251

[56] References Cited

U.S. PATENT DOCUMENTS

| | | |
|---|---|---|
| 3,244,808 | 4/1966 | Roberts . |
| 4,667,251 | 5/1987 | Hasegawa .............................. 358/457 |
| 5,111,310 | 5/1992 | Parker et al. ......................... 358/457 |
| 5,323,247 | 6/1994 | Parker et al. ......................... 358/457 |
| 5,341,228 | 8/1994 | Parker et al. ......................... 358/457 |
| 5,477,305 | 12/1995 | Parker et al. ......................... 358/457 |

OTHER PUBLICATIONS

1992 Optical Society of America, J. Opt. Soc. Am. A/vol 9 No. 11, Nov. 1992, Mitsa, et al., "Digital Halftoning Technique Using A Blue–Noise Mask".

IRE Transactions on Information Theory, Roberts, "Picture Coding Using Pseudo Random Noise," Feb. 1962, IT–8, No. 2, pp. 145–154.

"The Void–And–Cluster Method For Dither Array Generation," by Robert Ulichney, Sep. 1993, Proceedings of the SPIE, vol. 1913, pp. 332–343.

*Primary Examiner*—Scott A. Rogers
*Attorney, Agent, or Firm*—Hecker & Harriman

[57] ABSTRACT

An apparatus and method for providing bit-rate reduction and reconstruction of image data. Bit-rate reduction of 32-bit CMYK combinations into 16-bit code words is performed on a pixel by pixel basis by stepwise calculations or by using LUTs. Bit-rate reduction takes place during Post-Script® interpretation where the output image pixels are generated in a possibly arbitrary order. Bit expansion from 16-bit code words to 32-bit data for 8 bits per component of the CMYK image values is performed while real time printing, preferably by direct table look up. During bit-rate reduction, the image data may be non-linearly corrected to compensate for perceptual non-uniformities and for non-linearities in the input/output relationship of the reproduction device. Quantization and coding may be accomplished by thresholding the non-linearly corrected image data by values from a dither array. The coded image is stored in the frame buffer and subsequently retrieved, de-dithered, dequantized and inversely transformed for the perceptual non-linearity before printing.

24 Claims, 4 Drawing Sheets

FIG. 7

METHOD AND APPARATUS FOR PROVIDING BIT-RATE REDUCTION AND RECONSTRUCTION OF IMAGE DATA USING DITHER ARRAYS

BACKGROUND OF THE PRESENT INVENTION

1. Field of the Invention

This invention relates to a method and apparatus for providing bit-rate reduction and reconstruction of image data using dither arrays.

2. Background Art

As computing power increases and as computer users become more sophisticated, the use of color images in computer systems and computer based publishing systems is becoming increasingly widespread. The use of color images is no longer limited to professionals using high-end computer systems. Instead, the reproduction of color images is quickly becoming a standard feature of personal computers used by all levels of computer users.

Continuous-Tone and Halftone Printing

Some output rendering devices such as some displays and some laser printers are capable of reproducing continuous tone color or gray-scale images directly. The term continuous tone as used here includes both digital and analog representations of continuous tone images. Digital representations shall be referred to simply as digital images, and consist of picture elements, called pixels, that can take on one of several different image values at each pixel. Monotone (black and white, gray-scale) digital images allocate a particular number of bits at each pixel for the gray-scale. Color images are equivalent to several gray-scale images in that at each pixel one allocates a particular number of bits to each of the color components that make up the color image. For printing, one uses at least three color components, and most commonly four color components: C, M, Y and K indicating the amounts of cyan, magenta, yellow and black colorant needed to reproduce the image on a particular output printer. An example is the CLC500 color laser copier manufactured by Canon Inc., of Japan. The renderer in this case is a laser print engine which prints four colors, C, M, Y and K, at 8 bits per color for a total of 32 bits per picture element at a resolution of 400 picture elements per inch (also called dots per inch or dpi). It has been observed on the Canon CLC and similar printers that not all 256 ink levels (8 bits) per channel are perceptually or measurably distinguishable indicating that techniques that reduce the number of bits per picture element are likely to produce images with sufficiently high quality.

Frame Buffers and Printer Controllers

Often digital images are stored in frame buffers, also called page buffers. A large amount of memory may be needed to store a complete image. For example, to store a continuous-tone digital image of a typical 11 by 8.5 inch page size, at a spatial resolution of 400 pixels per inch, with four color components per pixel and one byte (8 bits) per component requires 59,840,000 bytes. It would thus be desirable to reduce the amount of memory needed to store such an image without losing a noticeable amount of image quality. A necessary part of any method for reducing the memory requirement is a corresponding method for reconstructing a full resolution image from the reduced-storage image. Reducing the memory required to store an image is called bit-rate reduction in that the average number of bits per pixel (the bit-rate) is reduced.

One application of frame buffers and bit-rate reduction is when a frame buffer is used as intermediate memory prior to printing on a continuous-tone digital printer. The printer controller in the Fiery® print server manufactured by the assignee of the present invention works in this way. The Fiery® printer controller comprises a frame buffer, a processor for taking an input image description file and generating and storing in the frame buffer the digital image corresponding to the input image description file, and a raster reader (also called a video processor) for reading out the image data from the frame buffer and sending the data to a renderer, typically a laser printer engine such as the Canon CLC 500, at the rate necessary to keep up with the print engine speed. Typically the image generation and frame buffer filling occurs at a much slower rate than is needed for read-out. Also, typically, the image generation and frame buffer filling does not occur in the sequential raster format required by the print engine. Hence, read out occurs only after the frame buffer is filled.

The input image description file may consist of a program in a page description language such as PostScript®, a product of Adobe Systems Incorporated of Mountain View, Calif. Generating and storing the digital image corresponding to the input image description file is known as RIPping. A device that perform this function is called a RIP or RIP engine. The derivation of RIP is "raster image processor (or processing)."

One of the main costs of a printer controller such as Fiery® is the large amount of memory required for a frame buffer sufficiently large to store a large rasterized image. It is desirable to use techniques that reduce the amount of frame buffer memory required. This requires a technique for reconstructing data from the reduced memory format to the number of data bits required by the printer. Read-out can occur at an extremely fast rate. For example, for a 30 page per minute printer, the average data rate is more than 230 Mbit per second. Burst rates may be much higher. Thus for any memory reduction technique to be useful in printer controllers, it is necessary for the corresponding reconstruction technique to work at a fast rate with little hardware (lest the cost of the hardware be more than the cost of memory saved).

Halftone Techniques

Most printing devices are incapable of exactly reproducing continuous-tone color (or continuous-tone gray-scale) images because their output is binary, in that the devices are capable of either depositing a fixed amount of colorant such as ink at a particular point, or not depositing any colorant at that point. Halftoning is the name given to techniques for converting continuous-tone image to binary (also called halftone) representations. Such techniques commonly are used in imagesetters, ink jet printers, laser printers, copiers, facsimile machines, liquid crystal displays and other reproduction or display devices. These techniques include clustered screening, neighborhood halftoning and dithering.

Clustered screening is the overlaying of a grid of points on the output image area, and defining at each point in the grid a dot of a predetermined shape, the size of which varies according to the value of the input image at that location. Typically, every dot of the clustered screen is composed of a plurality of printer picture elements. Clustered screening techniques are known in the art that simulate classical photographic contact screening as used in printing before the electronic age. Such simulations include specifying screen line frequency, rotation angle and halftone dot shape.

Neighborhood halftoning techniques such as error diffusion typically involve determining a pixel in the output image using the values at several pixels in the input image. Thus, neighborhood techniques require a large number of calculations, and are generally slow and processor intensive.

Halftoning by dithering involves performing point by point comparisons of each pixel in the input image with the corresponding pixel in an equally sized comparison array, which typically consists of repetitions, in both the vertical and horizontal directions, of a smaller array. The process is thus defined by the smaller array, which is known interchangeably as a "dither array," "dither matrix" and "threshold array." The terms "dither array," "dither matrix" and "threshold array" are used in the present application to refer to both the small core and to the larger periodic comparison array. The intended meaning should be clear to one in the art from the context. An output pixel is turned on (for example, taking on value 1 to represent applying a colorant when printing) if the value of the corresponding input pixel is greater than the value of the corresponding pixel in the dither array. Otherwise, the output pixel is turned off (for example, taking on value 0 to represent applying no colorant when printing). Dithering is a relatively fast procedure.

Requirements for Bit-Rate Reduction

As discussed above, it is desirable to be able to reduce the image bit-rate so that less memory is required to store an image in a frame buffer. A bit-rate reduction technique should work for images that contain natural photographic scenes, computer generated graphics and text, and synthetic scenes. For printer controller applications, bit-rate reduction techniques should not noticeably slow down the rate of rendering (printing) of the color image, and should be able to accommodate a continuous tone printer or a binary printer. Moreover, it is desirable that extreme image values should be preserved. Any regions on the image that would have been rendered by 0% or 100% colorant values in the image without performing bit-rate reduction, are still rendered by 0% or 100% colorant values, respectively. That is, it is desirable that extreme image values should be exactly reconstructed and printed. This attribute is termed the extreme points condition.

If the bit-rate reduction technique is to be used in a printer controller such as Fiery®, it is desirable that the technique be fast. One way to assure fast techniques is to make the techniques image independent in that the same technique is used whatever the image content. For example, the same technique would be used for an image of a face, an image of an outdoor mountain scene, text, and a pictorial advertisement containing text and several photographic scenes.

In addition, as already discussed above, for application in a printer controller such as Fiery®, it is necessary for the corresponding reconstruction technique to work at a fast rate using only a small amount of hardware. One way of assuring both fast bit-rate reduction and fast reconstruction is to restrict the reduction techniques to those performed on a single pixel basis, termed point processing techniques. This excludes techniques that involve spatial processing, such as the many image compression techniques known in the art that take advantage of spatial redundancy in images. One also is restricted to point processing if the printer controller contains a RIP for a page description language such as PostScript®. That is because, as discussed above, many page description processors, for example, PostScript® interpreters, generate image data in an unordered and unpredictable spatial pattern.

In addition, if the printer controller contains a RIP for a page description language such as PostScript®, it is desirable to have techniques that use some of the operations built-in to the page description language.

Prior Art Techniques

In the following discussion of prior art techniques, examples are described applying the techniques to the case of a 32-bit CMYK color image with 8 bits per color component. The techniques will be described applied to one of the color components. This is identical to the case of a black and white image with 8 bits per pixel. In these examples, for each color, each 8-bit pixel will be reduced to a 4-bit pixel. It will be clear to one in the art how each technique may be applied for other color and black and white images having a different numbers of bits per color and per pixel, and how each technique may be applied to achieve a different amount of compression than the 2:1 shown in the example.

One prior art technique for reducing the image bit-rate is to perform pixel-by-pixel uniform quantization on the original image data. Using this technique, the four most significant bits of each 8-bit image component value are selected as compressed image values for storing, for example, in the frame buffer for the printer controller application. In other words, code "C", for C in the range $0 \leq C \leq 15$, is assigned to all input values which lie in the interval [16*C,16*C+15]. For the printer controller application, when the stored coded image values are reconstructed for rendering, the reconstructed values are set equal to (16*C+8) at (almost) the mid-point of each coding interval. Each code therefore represents 16 input values. For example, code "3" is assigned to the interval [48, 63] and is reconstructed for printing as 56. Although this prior art scheme reduces the image bit-rate, it also suffers from severe contouring artifacts of the reconstructed image, and does not satisfy the extreme points condition.

In a modified uniform quantization scheme, the image data is quantized in the intervals [17*C−8,17*C+8], where C is the range $1 \leq C \leq 14$. Codes "0" and "15" are reserved for the end intervals [0, 8] and [247, 255], respectively. Reconstruction image values using this method are computed as 17*C for $0 \leq C \leq 15$. Although the extreme points condition is satisfied by this modified scheme, contouring artifacts are slightly intensified in the output image.

Another prior art scheme, perceptually uniform quantization, attempts to minimize contouring artifacts for a given number of optimized reconstruction levels (16 in the example) while still maintaining the extreme points condition. This technique recognizes that the human eye is more sensitive to errors which occur in the light areas of an image than to errors which occur in the dark areas of an image. Thus, errors created during the bit-rate reduction and reconstruction process, even if uniformly distributed across the intensity values of the image, are not perceptually balanced. One way to compensate for this sensitivity of the human eye is to transform the image before bit-rate reduction and after image reconstruction. The transformation is a pixel-by-pixel non-linear mapping and is designed so that a small absolute error in the intensity of the image is perceived approximately the same for any intensity level.

However, for the printer controller application, perceptually uniform quantization schemes are highly dependent on the rendering device. For some ink-based printers, for example, larger intervals can be tolerated at high ink levels but finer intervals are required for low ink levels. Moreover, reconstruction values are not necessarily at the mid-points of the intervals. The number of reconstruction levels and associated intervals can either be identical for the four inks or can be ink specific. If $n_x$ is the number of levels for ink X, where X stands for C, M, Y or K, then in the example-the case of reducing the total number of bits per pixel from 32 to 16—it is required that $n_c*n_m*n_y*n_k \leq 65536 (=2^{16})$. Contouring artifacts are still noticeable using this method, though these artifacts are uniformly distributed.

One can apply the same principles as for perceptually uniform quantization to any coding and decoding scheme by first non-linearly transforming the image data, and later applying the inverse transform to each reconstructed pixel. As will be appreciated by one skilled in the art, each of the techniques discussed herein may be modified in this way. Applying the non-linear transformation is known in the art as gamma correction.

Another prior art method for image bit-rate reduction uses pseudo-random noise. This technique uses the observation that in images, random noise tends to be more acceptable than quantization steps (contouring) in the output image. According to the pseudo-random noise method, for each color (8 bits in the example), a "random" quantity, for example, controlled by a pseudo-random number generator, is added to the input image before uniform quantization is applied. For reconstruction, the same "random" quantity, for example, controlled by a pseudo-random number generator synchronized to the pseudo-random number generator at the coding end, is subtracted from the de-uniform-quantized quantity to generate a reconstructed image value in the same pixel order that the quantity was added. One example of image bit-rate reduction and reconstruction using pseudo-random noise is disclosed by L. G. Roberts in a paper "Picture Coding Using Pseudo-random Noise," IRE Trans. on Information Theory, IT-8, No. 2, pp. 145–154, February 1962. Images coded using this scheme sustain slight noise artifacts and minor loss of details in light color areas (e.g., flesh tones) as well as blurred contours in smoothly changing ramps.

Applying the pseudo-random noise method to the printer controller application results in difficulties. With some RIPs, such as the PostScript® interpreter, the image data to be bit-rate-reduced is generated according to an arbitrary pixel order imposed by the order with which elements are defined in the image description file, and by the interpreter. Image decoding typically needs to be performed in a scanline order by the raster reader, making synchronization of the two pseudo-random generators difficult. One can pre-store the output of the pseudo-random number generator, but then one needs to store as much data as would be required for the whole image, therefore not saving any memory. Alternatively, one can use conventional decoding as if uniform quantization were used. In that case, the reconstructed image appears too noisy.

Any halftoning technique can be thought of as the coding part of a bit-rate reduction technique to one-bit per pixel per color. However, reconstructing from one-bit data is difficult. Coding/decoding to one-bit data typically requires spatial processing and is thus not readily applicable to the printer controller application.

Any halftoning technique may be combined with a uniform (or perceptually uniform) quantization scheme. In such a combined scheme, the image amplitude range is first divided into a small number of amplitude intervals (equivalent to applying a quantization scheme), then halftoning is applied to each amplitude region to reduce that region to only one bit. The end result is bit-rate reduction to the number of bits required to define the number of intervals. The quantization and halftoning steps can be combined into one composed technique. When dither arrays are used, this prior art technique is incorporated into the PostScript® Level 2 language as defined by Adobe Systems Incorporated, the term threshold arrays being used for dither arrays. PostScript® also allows this to be combined with a non-linear transformation such as for perceptually uniform quantization (gamma corrected uniform quantization) or other applications, the term transfer function being used for the non-linear transformation.

In the present invention, the combined halftone/uniform quantization bit-rate reduction technique shall be termed the dither array technique, the context making clear whether only a halftoning technique or the combined halftone/uniform quantization bit-rate reduction technique is intended. Applying the dither array technique to a printer controller for a continuous tone renderer and using the well known "ordered dither arrays" as defined by B. E. Bayer in "An optimum method for two-level rendition of continuous-tone pictures," Proceedings of the IEEE 1973 International Communications Conference (ICC '73), pp. 26.11–26.15, 1973, and using straight-forward reconstruction, results in a considerable reduction of contouring effects, mainly in smoothly varying area. However, pattern artifacts (due to the ordered dither) are noticeable in certain uniform ink levels.

Other techniques for producing dither arrays are known in the art. See, for example, the Robert Ulichney book, *Digital Halftoning*, The MIT Press, Cambridge, 1987, the Robert Ulichney paper, "The void-and-cluster method for dither array generation," Proceedings of the SPIE, Vol. 1913, pp. 332–343, 1993, and in the references disclosed therein. All these techniques are applicable to bit-rate reduction using dither arrays.

It is therefore desirable to have image independent bit-rate reduction and reconstruction of continuous tone color or black and white images. In particular, it is desirable to reduce the image bit-rate to the frame buffer by at least a factor of two to generate, in the example of 32 bits per pixel image data, 16 bits per pixel, equivalent to 4 bits per pixel per component. Moreover, it is also desirable to perform bit-rate reduction on a single pixel basis, discarding any spatial compression. It is also desirable to have improved reconstruction techniques that operate on the reduced bit-rate image, maintaining the full intensity resolution of the original image while significantly reducing the processing time required to generate image data for rendering, and that are applicable to printer controllers. It is also desirable to have improved bit-rate reduction techniques using dither arrays. It is also desirable to have improved bit-rate reduction techniques using dither arrays that can be implemented in a RIP for a page description language such as PostScript® using the functionality built-in to the language interpreter. It is also desirable to have improved reconstruction methods to incorporate into any bit-rate reduction techniques that uses dither arrays or that uses pseudo-random noise quantization.

SUMMARY OF THE INVENTION

The present invention provides an apparatus and method for providing bit-rate reduction and reconstruction of image data. In one preferred embodiment, bit-rate reduction (coding) of 32-bit CMYK combinations into either 16-bit code words or 8-bit code words is performed on a pixel by pixel basis by stepwise calculations or, in an alternate embodiment, by using LUTs. Bit-rate reduction takes place during PostScript® interpretation where the output image pixels are being generated in a possibly arbitrary order. Bit expansion (decoding) from the 16-bit (or 8-bit) code words to 32-bit data for 8 bits per component of the CMYK image values is performed while real time printing, preferably by direct table look up.

During bit-rate reduction, the image data may be non-linearly corrected to compensate for perceptual non-uniformities and for non-linearities in the input/output relationship of the reproduction device. Quantization and coding are preferably accomplished by thresholding the non-linearly corrected image data by values from a dither array. The coded image is stored in the frame buffer and subsequently retrieved, de-dithered, dequantized and inversely transformed for the perceptual non-linearity before printing.

In an alternate embodiment, adaptive spatial filtering is applied to decode the image data. This method is combined with the ordered dither coding technique or, in yet another alternate embodiment, with pseudo-random noise quantization.

DETAILED DESCRIPTION OF THE INVENTION

A method and apparatus for providing bit-rate reduction and reconstruction of image data using a dither array is described. In the following description, numerous specific details are set forth in detail in order to provide a more thorough understanding of the present invention. It will be apparent, however, to one skilled in the art, that the present invention may be practiced without these specific details. In other instances, well known features have not been described in detail so as not to obscure the present invention.

Overview

Using the present invention, in the monochrome case, an N-bit image (for example, 8-bit) is selected for reproduction, and in the color case, an N-bit per component, for example, a CMYK 4-component color image with 8 bits for each of C, M, Y and K, for a total of 32 bits per pixel. The image is transformed to make the image approximately perceptually uniform with respect to the device on which the image is to be rendered, for example, by applying a non-linear transformation to the image data. Approximate perceptually uniformity in this context is the property that a small absolute difference in the intensity of the image is perceived approximately the same for any intensity level. The transformed image data is then pixel-wise thresholded using a dither array so that the image data is reduced to a smaller number of bits per pixel per component, for example to 4 or 2 bits per pixel per component. This reduced information is stored in a frame buffer. In one embodiment, the transformation and thresholding of the image data is accomplished in a printer controller by the processor of a page description language, for example, by a PostScript® interpreter.

In one embodiment, once the reduced image data for the whole image, for example, a whole page, is stored in the frame buffer, the contents of the frame buffer are scanned one line at a time by a raster reader. As each pixel is scanned, a lookup table is used to de-dither, dequantize and inversely transform the image information to produce N' bits per pixel per component of reconstructed image data, where N' is the number of bits required by the rendering device to render the data (e.g., for the Canon CLC 500, N'=N=8 bits per pixel per component for a 32-bit reconstructed image to be printed).

Computer System

Figure 4:
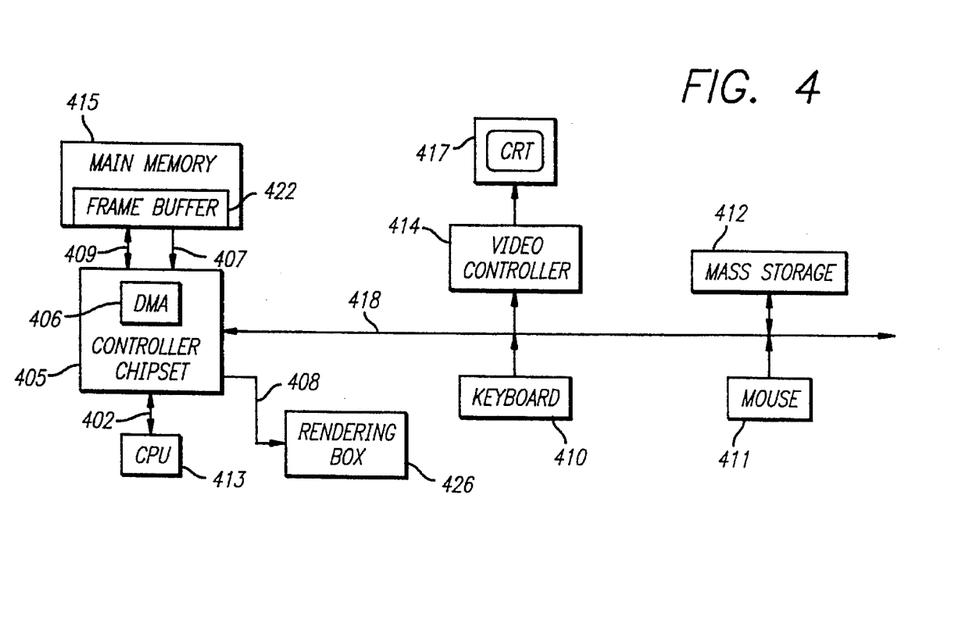
FIG. 4 is a block diagram illustrating a computer system for implementing the present invention.

The present invention may be implemented on any conventional or general purpose computer system or computer based publishing system. An example of one embodiment of a computer system for implementing this invention is illustrated in FIG. 4. The central components are main memory 415, CPU 413, and controller chipset 405. CPU 413 is coupled to the controller chipset 405 via bi-directional address/data bus 402. Controller chipset 405 sends control and addressing information to main memory 415 via address and control lines 407. Bi-directional data bus 409 is used to transfer data between main memory 415 and controller chipset 405. Controller chipset 405 functions as the control center for the computer system, and includes DMA controller 406 for direct memory access of main memory 415 through bi-directional data bus 409. Any input or output device is coupled to controller chipset 405 via bi-directional I/O bus 418. An optional keyboard 410, optional mouse 411, and optional video controller 414 are shown coupled to the bi-directional I/O bus 418. Keyboard 410 and mouse 411 also are shown coupled to the bi-directional I/O bus 418, and are used to communicate user commands to the computer system. The optional video controller is connected to an accompanying, and thus also optional, cathode ray tube (CRT) raster monitor 417. In the preferred embodiment as a printer controller, the video controller 414/CRT 417 combination is used for displaying, amongst other things, print scheduling and status data, as well as the image data to be printed. Monitor 417 is a type of monitor suitable for displaying graphic images. Mass storage 412 is coupled to bi-directional I/O bus 418, and may include both fixed and removable media, such as magnetic, optical or magnetic optical storage systems or any other available mass storage technology. The mass storage may be shared on a network, or it may be dedicated mass storage.

In one embodiment of this invention, the CPU 413 is a 32-bit or 64-bit microprocessor. However, any other suitable microprocessor or microcomputer may be utilized. Main memory 415 is comprised of dynamic random access memory (DRAM) and in the preferred embodiment of this invention as a printer controller, includes the memory for a frame buffer. At least 32 Mbytes of memory are used in the preferred embodiment. More or less memory may be used without departing from the scope of this invention.

In one preferred embodiment of this invention as a printer controller, controller chipset 405 is modified from a standard controller chipset to include, in addition to I/O bus 418, a raster output bus 408. In the preferred embodiment, the raster image processor of the printer controller is CPU 413 running an interpreter program for a page description language such as PostScript®, published by Adobe Systems Incorporated, and page or frame buffer 422 is part of main memory 415. Other interpreter programs such as those for the PCL5 printer controller language defined by Hewlett-Packard, Inc., of Palo Alto, Calif., may be used as well. Main memory 415 consists of 32 Mbytes of memory which is sufficient to store in frame buffer 422 a full letter-size page (11 by 8.5 inch) of 4-color 32 bits/pixel image information using 2:1 bit-rate reduction. More or less memory may be used. When the CPU 413 issues a command that it is ready for raster reading, indicating, for example, that the RIP has completed loading a page in frame buffer 422 and that a renderer connected to raster output bus 408 is ready to receive data, the memory is read, using DMA, to the raster output bus 408 in the required sequential raster format. At the same time, since DMA is used, processor CPU 413 is free to process (RIP) the next image. It is known in the art how to program a DMA device to achieve such data transfer. In an alternate embodiment, no DMA controller is used. Rather, CPU 413 is used to read data from memory via controller chipset 405 in the required sequential raster format. In that alternate embodiment, CPU 413 is programmed to identify whether any data it reads is from that part of main memory 415 which is in the frame buffer 422. If CPU reads data from frame buffer 422, it is sent to the raster output bus 408. It is known in the art how to program CPU 413 to achieve such data transfer.

The raster output bus 408 may then be connected to a rendering device 426. Rendering device 426 may be a printer, copier, facsimile machine or other device capable of reproducing images.

The computer system described above is for purposes of example only. The present invention may be implemented in any type of computer system processing environment or on any hardware or combination of hardware, software and computer system.

Image Data

The invention will be described in detail for one color component only. It will be understood by those skilled in the art that color images consist of at least three color components so that the invention may be applied to each color component. It will also be understood by those skilled in the art that the invention may be applied differently to each color component to achieve different amounts of bit-rate reduction for each component and using different non-linear transformations. It will also be understood by those skilled in the art that monochrome images consist of one color component.

Figure 1:
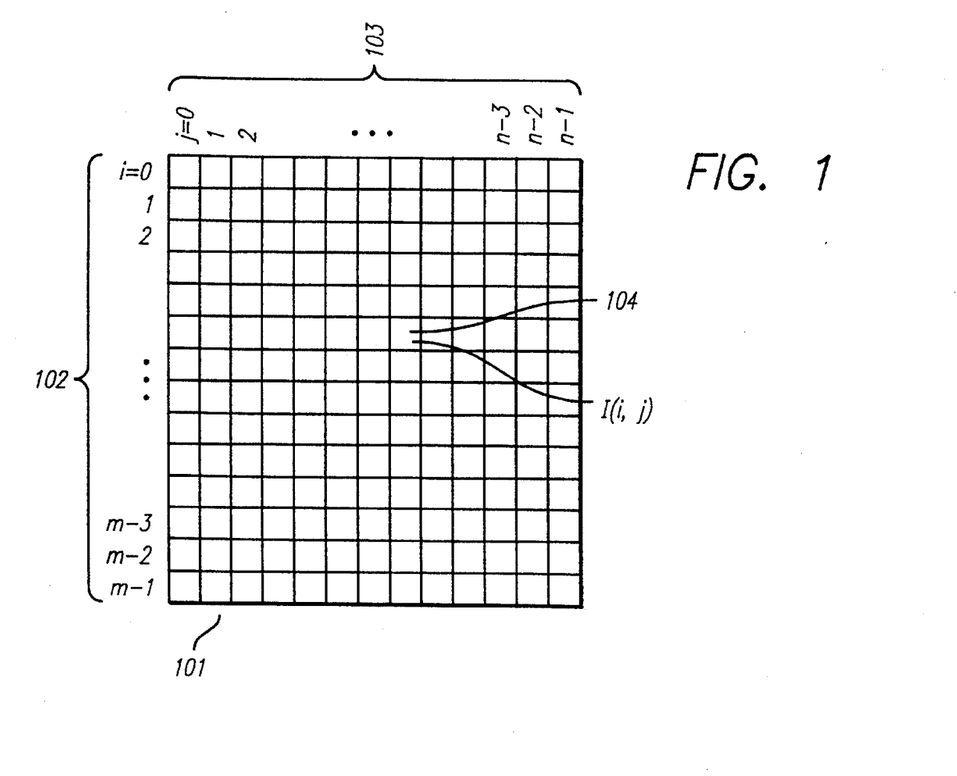
FIG. 1 is an illustration showing the image array of one embodiment of the present invention.

An example of original image data stored in an array is shown in FIG. 1. The image array 101 is comprised of m rows 102 and n columns 103 of pixels 104. Each of the m*n pixels 104 may be uniquely referenced by its row and column numbers: $I(i, j)$, where $i$, $0 \leq i \leq (m-1)$, represents the row number of the pixel, and $j$, $0 \leq j \leq (n-1)$, represents the column number of the pixel.

The original image is denoted by I, and the image data by $I(i, j)$ for each pixel may represent any number of predetermined image levels, where $0 \leq i \leq (m-1)$ and $0 \leq j \leq (n-1)$. In a binary valued image, $I(i, j)$ would take on one of only two values; $I(i, j)$ would equal zero or one, representing that the pixel is either off or on, respectively. Generally, in an original N-bit image, each pixel may represent any of $2^N$ different intensity levels by taking on a value $I(i, j)$ with $0 \leq I(i, j) \leq (2^N-1)$. For example, where the original image data is 8-bit gray-scale image data, each pixel $I(i, j)$ may be set equal to any of the 256 discrete levels between 0 and 255. In a 32-bit, four component CMYK color image, each pixel $I(i, j)$ includes 8-bit data (any of 256 levels of colorant) for each of the four components C, M, Y and K.

In the description which follows, many values are shown normalized to be in the range of 0 and 1. It will be appreciated that such normalization is used for teaching convenience only in order to clarify any descriptions of operations by leaving out details unrelated to understanding the operations themselves. For example, a quantity shown to be normalized between 0 and 1 could in practice take on values between 0 and 255. How to modify any descriptions of methods to not use normalized values would be understood by those skilled in the art. Furthermore, in one preferred embodiment of the invention, the coding part is implemented by supplying appropriate parameters and instructions to a PostScript® interpreter so that, as will be appreciated, the particular details of how the PostScript interpreter carries out the operations described below may differ. It will be appreciated that in no way should this be construed as limiting the scope of the present invention.

Gamma correction

As described above, in certain output devices such as monitors and printers, the relationship between the input signal and the resultant output is perceptually non-uniform. For example, in many CRT devices, the relationship between the input voltage and the output screen intensity is non-linear: in that varying the input voltage by, say, 10% does not correspondingly change the output intensity by 10%. Similarly, in continuous tone printers, changing the value of an input pixel by 10% does not correspondingly change the output printed density (or reflectance) by 10%.

Figure 2:
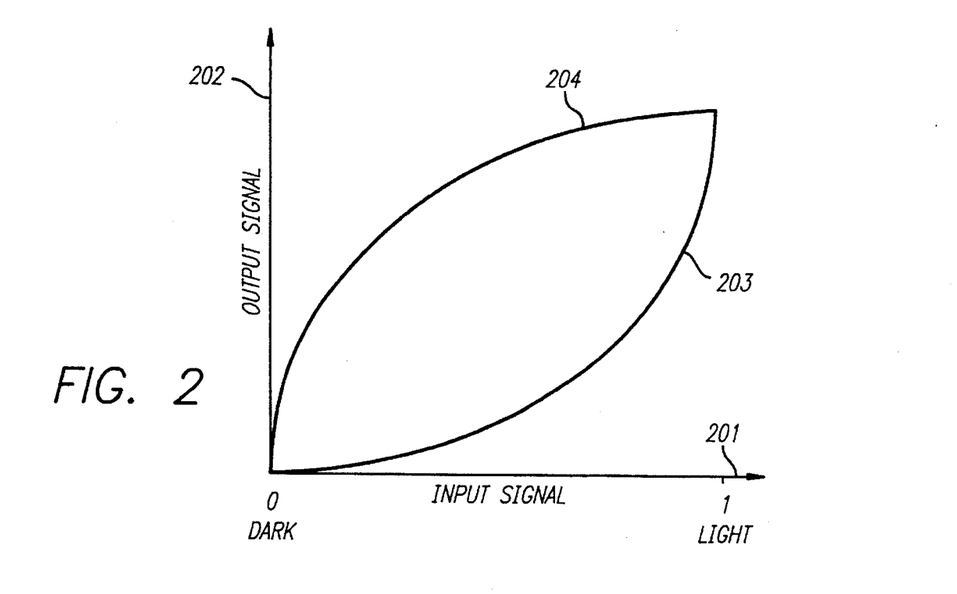
FIG. 2 is an illustration showing one possible non-linear input-output relationship and the corresponding inverse for gamma correction.

The compensation of perceptual non-uniformity between input and output levels may be accomplished using a non-linear transformation called herein gamma correction. It will be appreciated by those skilled in the art that the term gamma correction comes from photography where in the so-called linear range (in a logarithmic scale), the relationship between film density and exposure takes on a power law (in a linear scale), and, in mathematical notation, the power is usually given the Greek symbol gamma. However, in this description of the present invention, the term gamma correction is used for any non-linear transformation applied to input data. The principles of such gamma correction for compensating perceptual non-uniformities are well understood in the field of color reproduction. FIG. 2 illustrates one possible non-linear relationship between non-corrected input and perceived output signals. The horizontal axis 201 represents the input signal, shown here to take on one of the discrete quantization values, which, assuming normalization, are between 0 and 1. For an 8-bit image, the input signal of axis 201 takes on one of 256 equally spaced discrete values. The vertical axis 202 represents the intensity of the resultant output as perceived visually. The input-output relationship, shown by the curve 203, can be approximated by $y=x^\gamma$ where usually $0.5 \leq \gamma \leq 4$. Correction of this non-linear relationship may be accomplished by applying a non-linear transformation to the input image data prior to performing a bit-rate reduction on the image data. In the context of the PostScript® page description language, such a gamma correction transformation may be implemented as a PostScript transfer function. One possible gamma correction is shown by the curve 204 and is represented by $y=x^{(1/\gamma)}$.

In one embodiment of the present invention, where the output device is a continuous tone CMYK color ink-based printer, a novel gamma correction method is introduced which generalizes the above. This method uses two values for gamma instead of one. The pre-coding inverse of the non-linear transformation is, for x and x' denoting the normalized values of I(i, j) and I'(i, j), respectively, $$x=\{x'\}^{(1-x')\gamma_0+x'\gamma_1}$$

where preferably $\gamma_0=0.65$ and $\gamma_1=0.25$. Alternatively, other gamma corrections may be used, including multiple gammas, or no correction at all, without departing from the scope of the invention.

Coding Intervals

Figure 3:
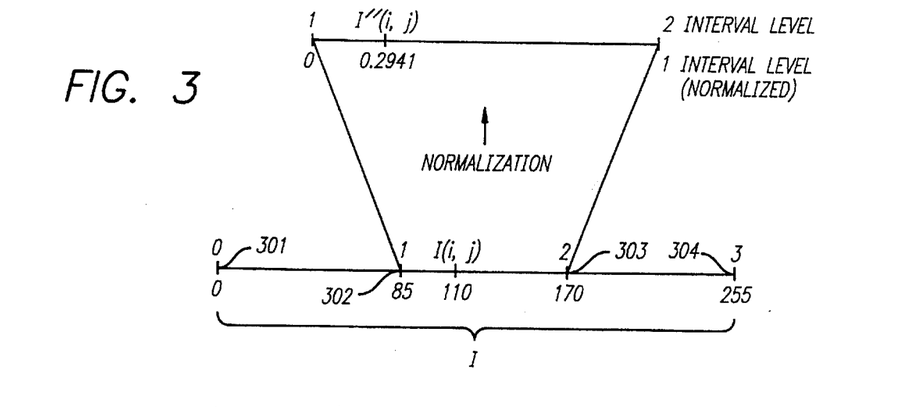
FIG. 3 is an illustration showing the concept of quantizing and normalization.

Once the original image data is gamma corrected, it is then uniformly quantized and then dithered using a dither array (threshold array in the context of PostScript®) to reduce the number of bits in the image data before storage in the frame buffer. Uniform quantization is the same as dividing the range of the amplitude gamma corrected image data into D−1 separate coding intervals, where D≧2. For each gamma corrected pixel, one determines which interval the pixel is in, and the offset within that interval. The offset is thresholded, and based on the thresholding result, the pixel is assigned a code corresponding to the lower or upper transition level for that interval. Thus, the coding intervals are "indexed;" that is, each is assigned a unique label called an index. Depending upon the results of the interval determination and thresholding, the pixel is assigned a code corresponding to the index of the interval it is in, or the next highest code. In the preferred embodiment, the intervals are indexed 0, 1, . . . , D−2, where D≧2, and thus the final code for any pixel is a number between 0 and D−1. In this way, each pixel is coded into $\log_2 D$ bits, assuming D is a power of 2. If D is not a power of two, the data is coded into $\log_2 D'$, where D' is lowest power of 2 such that D<D'. FIG. 3 illustrates one possible assignment of coding intervals. For purposes of illustration, assume coding is to be to 2 bits per pixel, corresponding to a four-fold reduction in the storage requirements for 8-bit image data. Since $\log_2 D=2$, D=4. The amplitude range for the image data is separated into D=4 equally spaced transition levels 301, 302, 303 and 304. This corresponds to three intervals, indexed as 0, 1, and 2, respectively. The index values 0, 1 and 2, respectively, correspond to coding levels 0, 1 and 2, respectively. Generally, for an N-bit image, the size of the interval between any two consecutive transition levels is $(2^N-1)/(D-1)$ levels of the original image data amplitude range. Indexing the transition levels by integer d, where 0≦d≦D−2, and denoting the transition levels as t(0), t(1), . . . , t(D−1), gives $t(d)=(2^N-1)*d/(D-1)$, d=0, 1, . . . , D−1. In the example shown in FIG. 3, for image data in the range 0 to 255, transition level 301 represents level $t(0)=((2^8-1)*0)/(4-1)=0$, transition level 302 represents level $t(1)=255*\frac{1}{3}=85$, transition level 303 represents level $t(2)=255*\frac{2}{3}=170$, and transition level 304 represents level $t(3)=255*\frac{3}{3}=255$.

The gamma corrected image data pixels are denoted by I'(i, j), where 0≦i≦m−1 and 0≦j≦n−1. When there is no gamma correction, I'(i, j)=I(i, j). Once the coding intervals are determined, each pixel I'(i, j) of the gamma corrected image data is read on a pixel-wise basis, and its appropriate coding interval [t(d), t(d+1)], denoted by index d, is determined such that t(d)≦I'(i, j)≦t(d+1) for some index d where 0≦d≦D−2. For example, if the 8-bit level of the image data I'(i, j)=110 as shown in FIG. 3, the appropriate coding interval where D=4 would be the coding interval [t(1), t(2)]. The index d (and, hence, lower transition level) of the appropriate coding interval may be determined, using division and truncation, as $d=int\{I'(i, j)/[(2^N-1)/(D-1)]\}$, where int{} is the truncation operation that returns the integer part of the value operated upon. In the example, d=int{110/(255/3)}=int(1.2941)=1. Thus, the proper coding interval for gamma corrected image pixel I'(i, j)=110 is between coding level t(1) and coding level t(2), and is identified by index 1.

Normalization

In addition to determining the appropriate coding interval [t(d), t(d+1)], identified by index d, for each I'(i, j), one also determines the normalized offset in the coding interval of index d for corrected image amplitude I'(i, j) for that pixel. The symbol I"(i, j) is used to denote the normalized offset for image data I'(i, j) in coding interval of index d, so that for a pixel in interval index d, recalling that I'(i, j) is normalized, I'(i, j)=[d+I"(i, j)]/(D−1). Conversion of the image data I'(i, j) into the interval index d and normalized offset data I"(i, j) may be accomplished by $$d=int\{I'(i, j)/[(2^N-1)/(D-1)]\} \text{ and}$$

$$I''(i, j)=\{I'(i, j)-(2^N-1)*d/(D-1)\}/\{(2^N-1)/(D-1)\}$$

where N, d and D are defined as before, resulting in 0≦I"(i, j)≦1, as required for normalization for the offset. In the example shown in FIG. 3, pixel level I'(i, j)=110 would be normalized approximately to I"(i, j)=[110−255*⅓]/[255/3]=0.2941. As will be understood by those skilled in the art, normalization of the offset is for convenience only and for describing the method in a universal way for any image and image offset data with any number of bits. Implementation of the present invention does not necessarily include normalization, or normalization to an interval of magnitude 1.

Halftoning

Once the image data for an individual image pixel is interval coded and the offset normalized, the normalized offset value for the pixel within that pixel's interval is now converted to a binary value by using a halftoning technique. That is, any pixel in interval d, which is the (un-normalized) range [t(d),t(d+1)], is coded to either code value d or code value (d+1) using a halftone technique for the (un-normalized) range [0,t(d+1)−t(d)] which is normalized for convenience to be the range [0,1]. In other words, a pixel in the interval of index d is assigned a code equal to d, the index of the interval it is in, or (d+1), the index of the interval it is in incremented by one, the assignment depending on the result of the halftone technique.

In one preferred embodiment, the PostScript® language interpreter is used to implement the halftoning process. The PostScript® (level 2) language provides halftoning and a high level of control over details of that halftoning process. For example, the language allows one to define the type of halftoning, and to specify, for that type of halftoning, independent halftoning parameters for each of a specified number of color components, for example, three or four color components for CMY or CMYK printing, respectively.

Two types of halftoning functions are supported by the PostScript® language, one based on clustered halftoning by defining explicitly a halftone screen by line frequency, rotation angle and halftone spot shape function, and the second based on the use of dither (threshold) arrays. In addition, PostScript® supports using transfer functions prior to halftoning. In the preferred embodiment which uses the PostScript® interpreter for coding, that is, for gamma correction, quantizing, and halftoning, threshold arrays are used for halftoning. In another preferred embodiment, all the coding steps are carried out explicitly rather than by a page description language interpreter.

Figure 5:
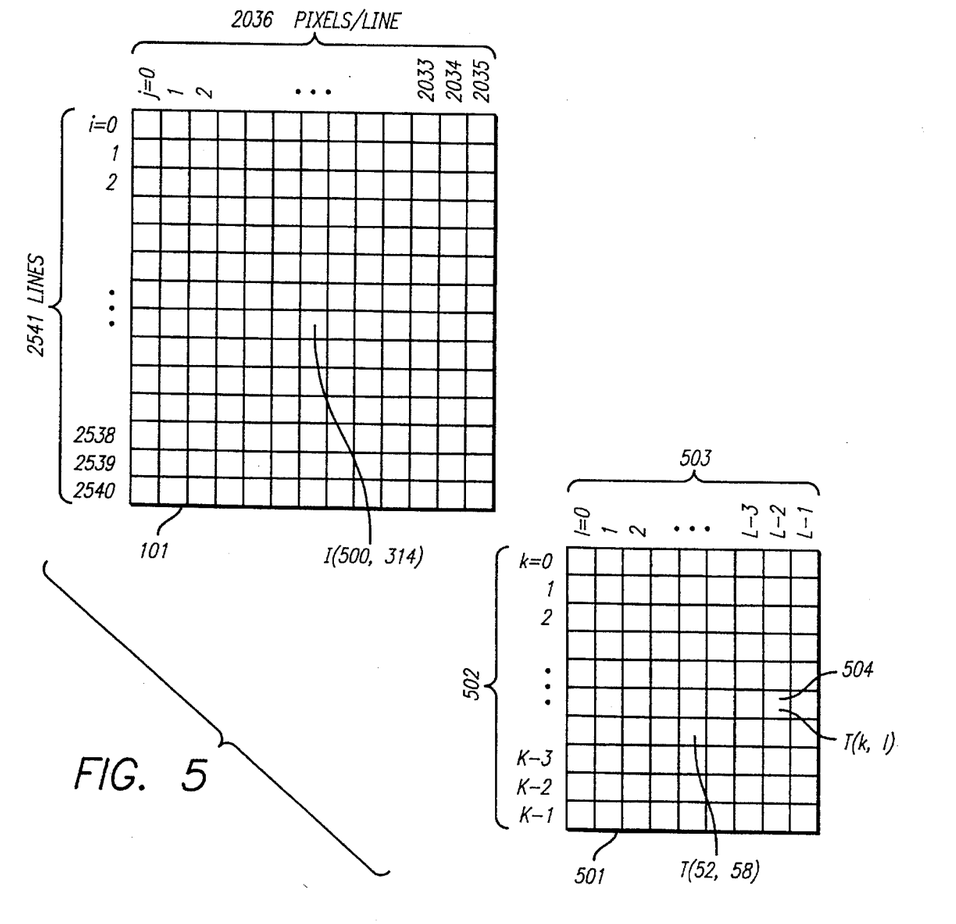
FIG. 5 is an illustration showing the thresholding array in one embodiment of the present invention.

A generalized threshold array is illustrated in FIG. 5. Threshold array 501 has K rows 502 and L columns 503, and contains individual pixels 504 denoted by T(k, l), where k, $0 \leq k \leq (K-1)$, represents the row number of the pixel, and l, $0 \leq l \leq (L-1)$, represents the column number of the pixel. For comparison with normalized data, the value of each pixel T(k, l) is shown normalized so that $0 \leq T(k, l) < 1$.

In the present invention, once I''(i, j), the normalized offset data, is computed, it is then compared with the corresponding threshold array pixel T(k, l), where k and l are now functions of i and j, respectively. Specifically, k=(i)mod(K) and l=(j)mod(L). If I''(i, j)<T(k, l), then the coded or dithered value C(i, j)=d, the index of the selected coding interval. Otherwise, C(i, j)=(d+1). In the example shown in FIG. 5, assume the threshold array is a 64 by 64 array, and the original image consists of 2541 lines with 2036 pixels in each line. The I'' offset at (500, 314) in an image is compared to the threshold array pixel contents, T(k, l), with k=(500) mod (64)=52, and l=(314) mod (64)=58. If the normalized offset value I'' at pixel (500, 314) is less than T(52, 58), then C(500, 314)=d, the lower interval value. Otherwise, C(500,314)=(d+1), the higher interval value.

In non-PostScript® preferred embodiments, to speed up the thresholding operation I''<T, a modified threshold array T'(k, l) may be precomputed, where T'(k, l)=1−T(k, l) and k and l are defined as before. The comparison operation of checking if I''<T now becomes checking if I''<1−T' which is identical to checking if I''+T'<1. When in the interval of index d, if one looks at int(I''+T'), the integer part of I''+T', then if int(I''+T')=0, that means I''<T, indicating code d should be used, and if int(I''+T')≠0, that means I''≥T, indicating code (d+1) should be used. Hence, in the interval of index d, for any pixel (i, j), C(i, j)=d+int{I''(i, j)+T'(k, l)} where k=(i)mod(K) and l=(j)mod(L). Thus, a comparison and branch operation, which in most CPUs is a relatively time consuming operation, is converted to additions to directly compute the code value.

In yet another alternate embodiment when a PostScript® implementation is not possible or not preferred, to speed up the thresholding operation I''<T, all code values C for all possible intensity values of I''(i, j) and k and l may be pre-calculated and pre-stored in a lookup table. Coding is then reduced to a table lookup operation. The address of such a table needs only be (N+log$_2$K+log$_2$L) bits, since the dependency on (i, j) in the code for I(i, j) comes about from looking up the location (i, j) in the threshold array, which in turn depends on k=(i)mod(K) and l=(j)mod(L); k and l can be stored in log$_2$K and log$_2$L bits, respectively, and are the log$_2$K and log$_2$L least significant bits of integers i and j, respectively, when K and L are powers of 2. The contents of each location in the lookup table is the code for the particular I(i, j). For example, for the case of coding from 8 bits per pixel to 4 bits per pixel using 64 by 64 threshold arrays, since 64=2$^6$, a lookup table of $2^{(8+6+6)}=2^{20}$ entries is required, with each entry 4 bits (a half a byte long). This requires 512 Kbytes of memory.

The exact contents of the threshold pixel in the threshold array may be calculated based on any of a large number of dithering methodologies. These include ordered dither techniques (due to Bayer), pseudo-random noise methods, void-and-cluster methods (due to Ulichney), "blue noise" pattern (due to Parker et. al.—see U.S. Pat. Nos. 5,111,310 and 5,341,228), or by error diffusion. The threshold array should be produced in such a way so as to generate a pattern free of artifacts.

In one preferred embodiment, Bayer's ordered dither array is used. For the case of reduction to 4 bits per color, a dither array with K=L=4 is used, that threshold (dither) array T(k, l), $0 \leq k$, l<4, defined as

| 0/16  | 12/16 | 3/16  | 15/16 |
| 8/16  | 4/16  | 11/16 | 7/16  |
| 2/16  | 14/16 | 1/16  | 13/16 |
| 10/16 | 6/16  | 9/16  | 5/16  | while for the case of reduction to 2 bits per color, a dither array with K=L=8 is used, that threshold array T(k, l),$0 \leq k$, l<8, defined as

| 0/64  | 48/64 | 12/64 | 60/64 | 3/64  | 51/64 | 15/64 | 63/64 |
| 32/64 | 16/64 | 44/64 | 28/64 | 35/64 | 19/64 | 47/64 | 31/64 |
| 8/64  | 56/64 | 4/64  | 52/64 | 11/64 | 59/64 | 7/64  | 55/64 |
| 40/64 | 24/64 | 36/64 | 20/64 | 43/64 | 27/64 | 39/64 | 23/64 |
| 2/64  | 50/64 | 14/64 | 62/64 | 1/64  | 49/64 | 13/64 | 61/64 |
| 34/64 | 18/64 | 46/64 | 30/64 | 33/64 | 17/64 | 45/64 | 29/64 |
| 10/64 | 58/64 | 6/64  | 54/64 | 9/64  | 57/64 | 5/64  | 53/64 |
| 42/64 | 26/64 | 38/64 | 22/64 | 41/64 | 25/64 | 37/64 | 21/64 |

For threshold arrays generated using other methods (void-and-cluster, blue noise, error diffusion or combinations of these), it is desired to use as large a threshold array as the associated hardware permits. In some preferred embodiments of this invention, if coding is to 4 bits per pixel per color component for four-color printing, a 64 by 64 dither array is used, while if coding is to 2 bits per pixel per color, a 128 by 128 dither array is used. As will be described below, choosing these sizes for the threshold arrays enables reconstruction with a lookup table of only 64 Kbytes.

Frame Buffer

Each pixel in the normalized image is thresholded, or dithered, on a pixel-by-pixel basis, and the resultant coded, bit-rate reduced image is stored in the frame buffer. The present invention reduces the storage requirements of the frame buffer by any factor up to reducing to 2 bits per pixel per color component. As an example, when the original image consists of 32-bit CMYK color image information (8 bits per color component), using sixteen quantized levels (D=16), the bit-rate is reduced to 4 bits per component, or 16 bits of color information per pixel total for storage into the frame buffer, for a memory reduction by a factor of two. Similarly, again when the original image consists of 32-bit CMYK color image information (8 bits per color component), if the number of quantized levels is selected as four (D=4), then the bit-rate is reduced to 2 bits per component, or 8 bits of total color information per pixel, a four-fold reduction. This reduction in image bit-rate reduces the memory requirements of the frame buffer.

Image Reconstruction

Once one full page of N-bit image information has been gamma corrected and dithered, thus reduced to a lower bit-rate coded image, and stored in the frame buffer, it is then sent by the raster reader to an output processor for reconstruction into a full resolution image for output to the renderer, for example, to a printer or to the printer part of a copier, such as the Canon CLC 500. In the case of a 32-bit original CMYK image, the coded 2- or 4 -bit per component image may be reconstructed into a 32-bit color image.

Reconstruction Using Correction when using Threshold Arrays

The coded image $C(i, j)$ typically is read from the frame buffer by the raster reader one scan line at a time, with each pixel read in sequential order. The present invention includes a novel method for reconstructing bit-rate reduced images when coded using dither arrays. When threshold array $T(k, l)$ is used, a correction value $R''(k, l)$ is computed for each coded image value $C(i, j)$ at position $(i, j)$ as $R''(k, l)=T(k, l)-0.5$, where $k=(i)\mod(K)$ and $l=(j)\mod(L)$. This correction value is applied to each coded image value $C(i, j)$ to produce a dequantized image array $R'(i, j)$, where $R'(i, j)=\{C(i, j)+R''(k, l)\}*(2^N-1)/(D-1)$. As an example, when N=8 and D=4, if $C(i, j)=1$ and $T(k, l)=0.7$, then the correction value $R''=T-0.5=0.2$, and the reconstructed value is $R'=(C+R'')*255/3=(1+0.2)*85=102.0$.

Because dequantized R' is restricted to the range $0 \leq R' \leq (2^N-1)$, any corrected values for R' which lie outside of this range are truncated to the minimum or maximum values. As an example, when N=8 and D=4, if $C(i, j)=3$ and $T(k, l)=0.8$, then the correction value $R''=T-0.5=0.3$, and the reconstructed value is $R'=(C+R'')*255/3=(3+0.3)*85= 280.5$, which exceeds the highest level (255) available for 8-bit color space. In this case, the corrected (but unquantized) value (C+R'') would be clipped from 3.3 to 3, so that R'=255. A similar process occurs if (C+R'')<0.

Extreme points condition

As an option, one can ensure that the extreme values in the original image are always reconstructed as extreme values, for example, that the 0% and 100% colorant levels are preserved. This is termed the extreme points condition. To satisfy the extreme points condition, no correction is applied to any coded image value $C(i, j)$ that is 0 or that is (D-1). Instead, these values are transformed into the dequantized image array uncorrected 0 or $(2^N-1)$ for the case of $C(i, j)=0$ or (D-1), respectively.

As an example, when N=8 and D=4, an original image value will take on the highest value 3 independent of the value $T(k, l)$ of the threshold array at the position of interest (i, j). For the case when the option of maintaining the extreme points condition is not chosen, if $T(k, l)=0.2$, the correction $R''(i, j)=T(k, l)-0.5=-0.3$, resulting in a reconstructed value $R'(i, j)=(3-0.3)*255/3= 229.5$. Even after the inverse gamma correction, the resultant $R(i, j)$ most likely would be less than 255. Choosing to keep the extreme points condition forces $R(i, j)$ to be 255 when $C(i, j)=3$.

When the extreme points condition option is chosen, then, since when $C(i, j)=0$, $R'(i, j)=0$ and when $C(i, j)=(D-1)$, $R'(i, j)=(2^N-1)$, the step of truncating to ensure that R' is in the range $0 \leq R' \leq (2^N-1)$ is not necessary. In the example of N=8 and D=4, if $C(i, j)=3$ and $T(k, l)=0.8$, then, applying the extreme points condition, $R'(i, j)=255$.

Inverse Gamma Correction

If gamma correction is applied to the original image data, then reconstructed image array $R(i, j)$ may be obtained by applying the inverse of the non-linear transformation to each value in the dequantized image array $R'(i, j)$. In other words, if $I'(i, j)=f\{I(i, j)\}$ is the gamma correction applied, then $R(i, j)=g\{R'(i, j)\}$, where function g is the inverse of function f.

Lookup Table Reconstruction

Figure 6:
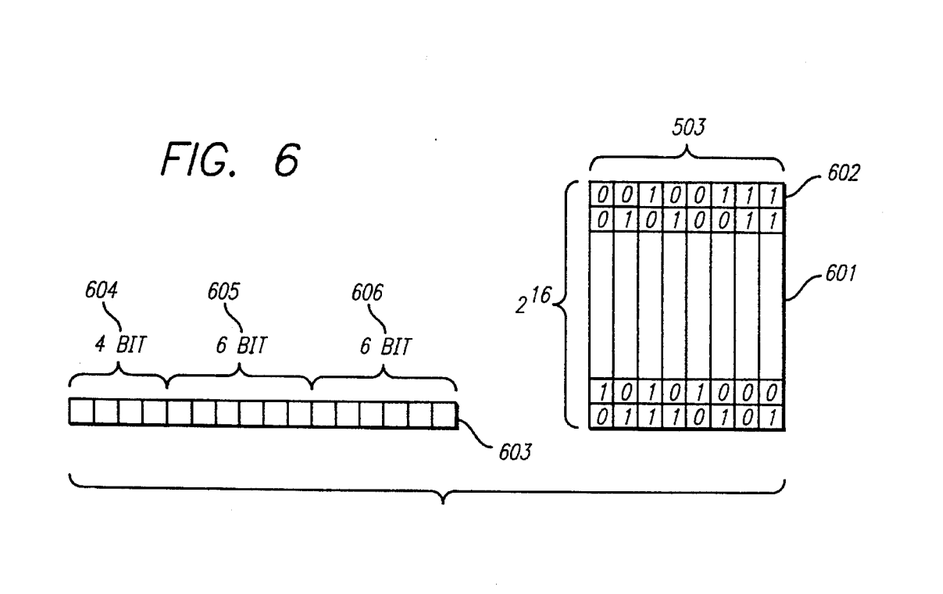
FIG. 6 is an illustration showing the reconstruction lookup table for one embodiment of the present invention.

To speed-up the reconstruction process, a lookup table (LUT) is constructed to perform the de-dithering correction, dequantization, inverse transformation, and, if chosen as an option, making sure the extreme points condition is satisfied. For example, in one preferred embodiment, when coding is to 4 bits per pixel per color component for a 64 by 64 dither array is used, and a LUT with 16-bit addressing can be constructed. Similarly, when coding is to 2 bits per pixel per color component, a 128 by 128 dither array is used, and a LUT also with 16-bit addressing can be constructed. For an 8 bits per pixel per color component rendering device, the content of each LUT entry is one byte, so that for the above cases, a lookup table can fit in 64 Kbytes of memory. The structure of such a LUT is illustrated in FIG. 6. A byte 602 in the LUT 601 is addressable using a 16-bit address 603. Each 8-bit byte 602 in the memory represents a completely reconstructed image data value $R(i, j)$. Recalling that for each possible coded image value C from some known pixel location (i, j), where $0 \leq C \leq (D-1)$, entry R is to be computed using $$R(i, j)=g\{[C(i, j)+(T(k, l)-0.5)]*(2^N-1)/(D-1)\},$$

with $k=(i)\mod(K)$ and $l=(j)\mod(L)$, one notes that in addition to C, one only needs to know the $\log_2 K$ least significant bits in the computer representation of integer i (this gives k) and the $\log_2 L$ least significant bits in the computer representation of integer j (this gives l). Thus an address to the LUT may be formed from code C, the $\log_2 K$ least significant bits in the computer representation of integer i, and the $\log_2 L$ least significant bits in the computer representation of integer j. In the preferred embodiment using the LUT, for the case of 8 bits per pixel per color component, dither arrays with $K=L=64=2^6$ are used for bit-rate reduction by a factor of two to give 4-bit code words, and dither arrays with $K=L=128=2^7$ are used for bit-rate reduction by a factor of four to give 2-bit code words. In each case, 16 bits is sufficient to address LUT 601.

The $2^{16}$ 8-bit entries corresponding to each 16-bit address 603 are computed as follows: for each possible coded image value C from some known pixel location (i, j), the address is computed using C and the $\log_2 K$ and $\log_2 L$ least significant bits of i and j, respectively. For that address, entry R is computed using $R(i, j)=g\{[C(i, j)+(T(k, l)-0.5)]*( 2^N-1)/$ (D−1)}, where k=(i)mod(K) and l=(j)mod(L). If adhering to the extreme points condition is not chosen, then if R does not lie in the range $0 \leq R(i, j) \leq (2^N-1)$, R(i, j) is truncated to one of the end points of that range. If adhering to the extreme points condition is chosen, then in those locations where C(i, j)=0 or (D−1), the input values are not corrected in order to maintain the extreme points condition.

For the case of coding from 8 bits per pixel to 4 bits per pixel using 64 by 64 threshold arrays, each computed 8-bit byte R(i, j) 602 is stored at a 16-bit address 603 obtained by concatenating the 4-bit C(i, j) data value 604 with the 6 least significant bits 605 of number i and the 6 least significant bits 606 of number j. For example, if C(123, 458)=12, then the final reconstructed image value R(123, 458) would be stored at address 1100 111011 001010, where 1100 is the binary representation of C=12, and 111011 and 001010 are the 6 least significant bits of the binary representations of the specific indices 123 and 458, respectively. For the case of coding from 8 bits per pixel to 2 bits per pixel using 128 by 128 threshold arrays, each computed 8-bit byte R(i, j) 602 is stored at a 16-bit address 603 obtained by concatenating the 2-bit C(i, j) data value with the 7 least significant bits of number i and the 7 least significant bits of number j.

The invention may be practiced with LUT memories larger than 64K bytes, or with threshold arrays of any shape or size, without departing from the spirit or scope of the invention.

Expected Performance Improvement By Using Correction Method

It is known in the art that one measure of the relative performance of a bit-rate reduction and reconstruction scheme is the root mean square (RMS) error. The RMS error depends on the characteristics of the image data as well as on the transfer function applied in the process. For an arbitrary distribution of pixel values in a digital image and when no transfer function is being applied in the process, the RMS error of the reconstruction with correction method according to the present invention is reduced by a factor of sqrt(2) (approximately 1.4) compared to the RMS error in the process with straight forward reconstruction rather than the reconstruction with correction method of the present invention. The RMS error is increased somewhat when the extreme points condition is maintained. However, not maintaining the extreme points condition may produce unacceptable artifacts.

Reconstruction by Spatial Filtering

In an alternate embodiment of the present invention, spatial filtering is used in the decoding stage. According to this modified reconstruction method, called adaptively filtered dither, for final reconstruction, each reconstructed pixel is being replaced by an average of the reconstructed values in a small neighborhood (3 by 3 pixels in the preferred embodiment) centered at that pixel, where said reconstructed values are according to the unmodified reconstruction with correction method of the present invention. To prevent blurring of sharp edges, such as black text on unprinted paper, filtering is only applied if the relevant neighborhood is coded only by two consecutive transition values. That is, filtering is applied only to otherwise noisy reconstructed areas in the image.

One advantage of the modified reconstruction scheme is that it can be applied to a wide variety of coding schemes, for example for pseudo-random noise coding. One may recall that in the pseudo-random method, an amount of pseudo-random noise is added during coding, and an identical amount, from an identical and synchronized source of pseudo-random noise, is subtracted during decoding. In the printer controller application, this is often impossible because the RIP generates pixels for coding at an order different from the sequential raster order required for readout to the renderer, precluding synchronizing pseudo-random noise sources. Hence, only decoding without subtracting pseudo-random noise can be used, usually leading to noisy images. The adaptive filtering reconstruction method according to the present invention is applicable in this situation.

Details of the preferred embodiment of the adaptive filtered reconstruction method are as follows. When reconstructing an image value at pixel location (i, j), one examines the 3 by 3 neighborhood around this pixel. Defining $C_{min}$= minimum{C(i',j'),i−1$\leq$i'$\leq$i+1, j−1$\leq$j'$\leq$j+1} and $C_{max}$= maximum{C(i',j'),i−1$\leq$i'$\leq$i+1, j−1$\leq$j'$\leq$j+1}, then averaging is applied in the neighborhood depending on the quantity ($C_{max}-C_{min}$) describing the spread of values on that neighborhood. If ($C_{max}-C_{min}$)$\neq$1 then R(i, j)=t(C(i, j)), else R(i, j)=average{(Ci',j')} in the region i−1$\leq$i'$\leq$i+1, j−1$\leq$j'$\leq$j+1.

Implementing the adaptive filtered reconstruction method in a printer controller requires adding a three raster-line buffer to the raster reader to enable the determination of ($C_{max}-C_{min}$) and of the average.

Coding Color Images

When coding color images (for example, CMY, CMYK or RGB), each component is usually compared with a threshold array independently. There are a variety of ways to apply multiple threshold arrays to multiple components.

1. The same threshold array could be applied to all components:
2. The threshold array for each component could be shifted by an arbitrary number of pixels either horizontally, vertically, or both horizontally and vertically relative to each other for each of the components.
3. For up to four components, the threshold arrays for the different components can be rotated by multiples of 90 degrees relative to each other. For CMYK images, if the original dither array T(k, l) is used for cyan, T(k, l) rotated by 90 degrees is used for magenta, T(k, l) rotated by 180 degrees is used for yellow, and T(k, l) rotated by 270=−90 degrees is used for black. For RGB images, if the original dither array T(k, l) is used for red, then T(k, l) rotated by 90 degrees and 180 degrees are used for the green and blue components, respectively.
4. The threshold array addresses may be flipped with respect to each other for the different color components. For CMYK images, for the case that dither array dimensions K and L are both powers of 2, if the original dither array T(k, l) is used for cyan, then T(not(k), l), T(k, not(l)) and T(not(k), not(l)) are used for the magenta, yellow and black components, respectively. If the dither array dimensions K and L are not powers of 2, then one substitutes [K−(k+1)] for not(k) and [L−(l+1)] for not(l), respectively, in the above arrangement.
5. An independent threshold array can be generated for each component.

It is not necessary to reduce the bit-rate of each color component to the same number of bits per pixel. In an improved embodiment of the present invention, colors that are known to contribute less to the perception of colors are reduced by more than the more significant colors. For CMY and CMYK images, it is known in the art that the eye is more sensitive to variations in magenta than in variations in cyan, and more sensitive to variations in cyan than in variations in yellow. Similarly, it is known in the art that the eye is more sensitive to variations in green than in variations in red, and more sensitive to variations in red than in variations in blue. In an improved embodiment of this invention, for 24-bit CMY data, cyan was reduced to 4 bits per pixel, magenta to 5 bits per pixel and yellow to 3 bits per pixel for a total reduction to 12 bit-data.

Flowchart of One Embodiment of the Present Invention

Figure 7:
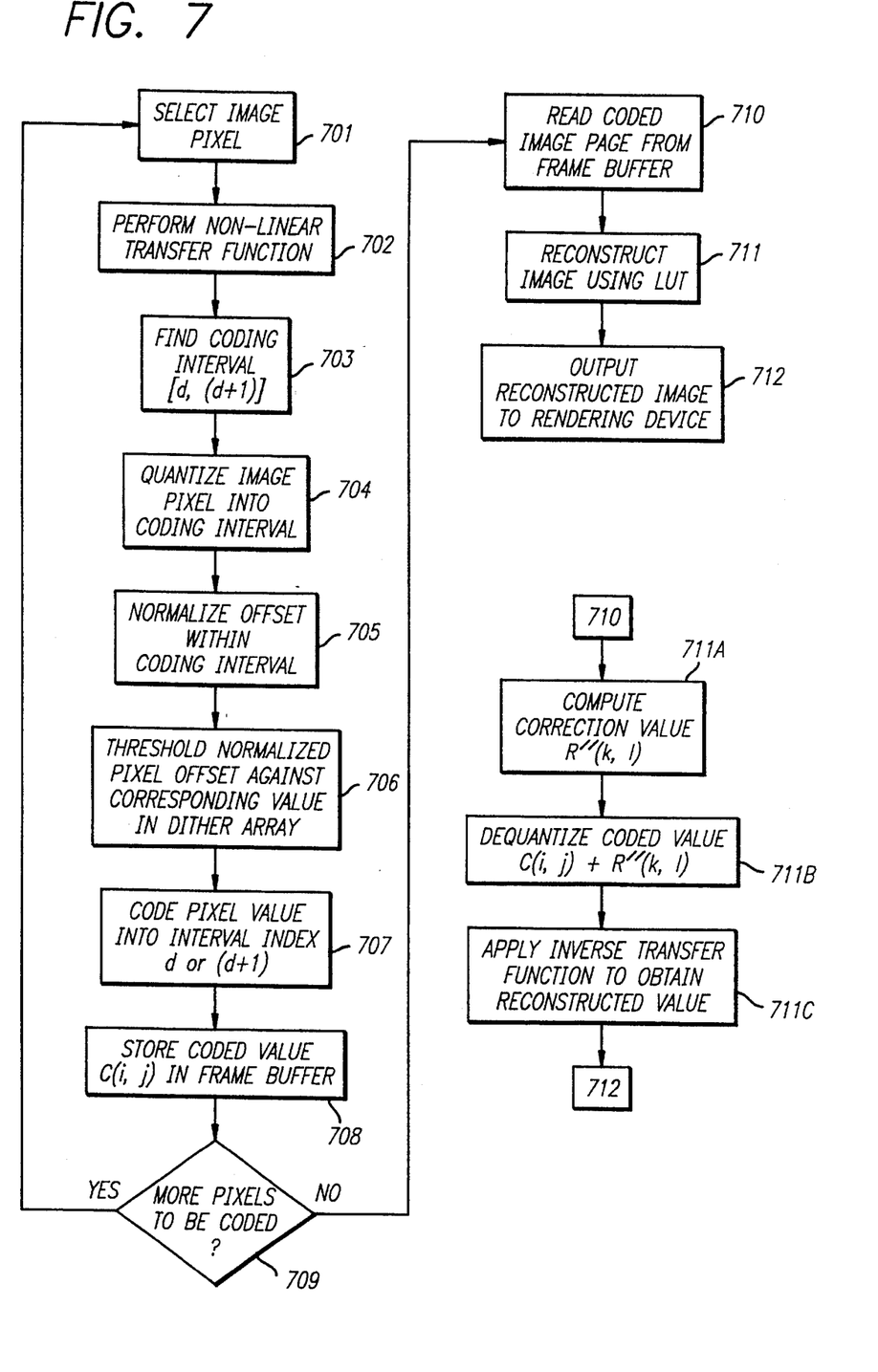
FIG. 7 is a flow diagram illustrating the method of one embodiment of the present invention.

A flowchart illustrating the method of one embodiment of the present invention is shown in FIG. 7 for one color component. At step 701, a pixel of the component of the image to be printed is selected. At step 702, if desired, a non-linear transformation is performed on that pixel value of the component to provide gamma correction to the image. At step 703, the proper coding interval, defined by index d, is determined for that pixel of the image.

Once a coding interval d is determined, the pixel value I(i, j) (or I'(i, j) if gamma corrected) is quantized into the coding interval at step 704 and the offset I"(i, j) is normalized at step 705 within the coding interval so that $0 \leq I"(i, j) \leq 1$. At step 706, the normalized pixel offset value I"(i, j) is thresholded against a corresponding value from a dither array, and the pixel value is coded at step 707 into either the interval index d, or (d+1), the interval index incremented by one.

As each pixel value is coded, it is stored in the frame buffer at step 708. At step 709, control returns to step 701 if additional image pixels remain to be coded. Steps 701 through 708 are repeated until all pixels have been thus coded.

The above steps are shown in this embodiment as being carried out pixel-by-pixel because with some RIPs, for example a RIP containing a PostScript® Interpreter, the pixels are available in a non-sequential order.

Once a full page of coded pixel values has been stored in the frame buffer, corresponding to the end of RIPping, then at step 710 the coded image page is read by the raster reader output processor from the frame buffer, typically one line at a time. As this coded information is read, it is reconstructed at step 711. Step 711 can be carried out using a lookup table. The lookup table can be pre-calculated so that the reconstruction steps of de-dithering, dequantizing, and performing the non-linear inverse transformation can be accomplished in one look up step. Alternatively, control may proceed from step 710 to step 711A, where the correction value R"(k, l) is computed, then to step 711B, where the coded value is dequantized using the corrected value, and then to step 711C, where, if at step 702 a non-linear transformation was performed, an inverse transfer function may be applied to transform the output component.

After step 711 (or, equivalently, steps 711A–C) is completed, the reconstructed image is output to the rendering device, such as a printer or copier, at step 712.

In an alternate embodiment of the invention, step 711 or steps 711 A, B and C are replaced by adaptive spatial filtering which can be combined with applying an inverse transformation if a non-linear inverse transformation was applied at step 702.

Thus, a method and apparatus for performing bit-rate reduction and reconstruction of image data using a dither array is disclosed.

What is claimed is:

1. A method for reducing the bit-rate of original image data into coded image data, and for reconstructing said coded image data into output image data, said original image data comprising an original color component comprising a first plurality of N-bit original pixels, said coded image data comprising a coded color component comprising a second plurality of M-bit coded pixels, said output image data comprising an output color component comprising a third plurality of N'-bit output pixels, the possible range of each of said N-bit input pixels consisting of a plurality of equally sized contiguous intervals, the number of said intervals determined by M, said method comprising the steps of:

(a) storing a threshold array in a first memory, said threshold array comprising a fourth plurality of threshold pixels;

(b) pixel-wise generating a corresponding coded pixel in said second plurality for each original pixel in said first plurality until said second plurality is determined, said step of generating said coded pixel for said original pixel comprising the steps of:

(i) determining an interval in said plurality of intervals, and an offset in said interval, for said original pixel; and (ii) generating said coded pixel for said original pixel, said coded pixel determined by said interval and by said offset and by the value of a threshold pixel in said fourth plurality, the location of said threshold pixel in said fourth plurality determined by the location of said original pixel in said first plurality;

(c) selecting a coded pixel in said second plurality;

(d) computing a correction value for said selected coded pixel, said correction value determined by the code of said selected coded pixel and by the value of a corresponding threshold pixel of said fourth plurality, the location of said corresponding threshold pixel determined by the location of said selected coded pixel in said second plurality; and (e) applying said correction value to said selected coded pixel to produce an output pixel of said third plurality.

2. The method of claim 1 further comprising the steps of:

in said step (b), prior to said steps (i) and (ii), gamma correcting said original pixel by performing a first non-linear transformation on the value of said original pixel to produce a compensated pixel, said steps (i) and (ii) performed on said compensated pixel instead of said original pixel;

in said step (e), applying said correction value to said selected coded pixel to produce a dequantized pixel instead of an output pixel; and (f) inverse gamma correcting said dequantized pixel by performing a second non-linear transformation on the value of said dequantized pixel to produce an output pixel of said third plurality.

3. The method of claim 2 wherein said offset is normalized to a fixed range and the threshold pixels of said fourth plurality are normalized to said fixed range.

4. The method of claim 1 wherein said original image data further comprises a plurality of said original color components, said coded image data further comprises a plurality of corresponding said coded color components, and said output image data further comprises a plurality of corresponding said output color components, each original color component having a corresponding threshold array in a plurality of threshold arrays, said step (b) applied to each original color component, said steps (c), (d) and (e) applied to each corresponding coded color component.

5. The method of claim 2 wherein said step (b) further comprises the step of storing said coded pixel in a page buffer after said step of generating said coded pixel, and wherein said step (c) of selecting a coded pixel further comprises retrieving said selected coded pixel from said page buffer.

6. The method of claim 2 wherein said first non-linear transformation comprises compensation for perceptual non-uniformities in said original image data and wherein said second non-linear transformation comprises an inverse of said compensation.

7. The method of claim 2 wherein said inverse of said compensation is of the form $x=\{x'\}^{(1-x')\gamma_0 + x'\gamma_1}$.

8. The method of claim 5 wherein said step (b) is carried out by a RIP raster image processor, said RIP including an interpreter of a page description language, said original image data incorporated in an original file, said original file comprising a plurality of commands in said page description language.

9. The method of claim 5 wherein said second plurality of coded pixels are stored in said page buffer according to a raster format, and wherein said steps (c), (d), (e) and (f) are performed pixel-wise on all pixels in a raster line of said raster format.

10. The method of claim 5 wherein said steps (d), (e) and (f) are carried out by a lookup operation in a decoding lookup table, said decoding lookup table stored in a second memory.

11. The method of claim 8 wherein said step (b) is carried out by said interpreter.

12. The method of claim 11 wherein said page description language is PostScript®.

13. An apparatus for reducing the bit-rate of original image data into coded image data, and for reconstructing said coded image data into output image data, said original image data comprising an original color component comprising a first plurality of N-bit original pixels, said coded image data comprising a coded color component comprising a second plurality of M-bit coded pixels, said output image data comprising an output color component comprising a third plurality of N'-bit output pixels, the possible range of each of said N-bit input pixels consisting of a plurality of equally sized contiguous intervals, the number of said intervals determined by M, said apparatus comprising:

a first memory for storing said original image data;

a second memory for storing a threshold array, said threshold array comprising a fourth plurality of threshold pixels;

a processor coupled to said first and second memory, and to a third memory, said processor for pixel-wise generating a corresponding coded pixel in said second plurality for each original pixel in said first plurality until said second plurality is determined, said pixel-wise generation comprising the steps of:

(i) gamma correcting said original pixel by performing a first non-linear transformation on the value of said original pixel to produce a compensated pixel;

(ii) determining an interval in said plurality of intervals, and an offset in said interval, for said compensated pixel; and (iii) generating said coded pixel for said compensated pixel, said coded pixel determined by said interval and by said offset and by the value of a threshold pixel in said fourth plurality, the location of said threshold pixel in said fourth plurality determined by the location of said compensated pixel in said first plurality;

said third memory for storing an array of said second plurality of coded pixels;

a selector coupled to said third memory, said selector for selecting a coded pixel from said array of said second plurality of coded pixels;

a reconstructor coupled to said selector and to said second memory, said reconstructor for generating a correction value for said selected coded pixel, said correction value determined by the code of said selected coded pixel and by the value of a corresponding threshold pixel of said fourth plurality, the location of said corresponding threshold pixel determined by the location of said selected coded pixel in said threshold array, said reconstructor further for applying said correction value to said selected coded pixel to produce a dequantized pixel of said third plurality, said reconstructor further for inverse gamma correcting said dequantized pixel by performing a second non-linear transformation on the value of said dequantized pixel to produce an output pixel of said third plurality.

14. The apparatus of claim 13 wherein said third memory is a page buffer.

15. The apparatus of claim 13 wherein said first non-linear transformation comprises compensation for perceptual non-uniformities in said original image data and wherein said second non-linear transformation comprises an inverse of said compensation.

16. The apparatus of claim 13 wherein said inverse of said compensation is of the form $x=\{x'\}^{(1-x')\gamma_0 x'\gamma_1}$.

17. The apparatus of claim 13 wherein said offset is normalized to a fixed range and the threshold pixels of said fourth plurality are normalized to said fixed range.

18. The apparatus of claim 14 wherein said array of said second plurality of coded pixels is stored in said page buffer according to a raster format.

19. The apparatus of claim 14 wherein said pixel-wise generation is carried out by a RIP raster image processor, said RIP including an interpreter of a page description language, said original image data incorporated in an original file, said original file comprising a plurality of commands in said page description language.

20. The apparatus of claim 19 wherein said pixel-wise generation is carried out by said interpreter.

21. The apparatus of claim 20 wherein said page description language is PostScript®.

22. The apparatus of claim 14 wherein said reconstructor comprises a decoding lookup table, said reconstructor generating said correction value, applying said correction value to said selected coded pixel, and inverse gamma correcting said dequantized pixel by a lookup operation in said decoding lookup table.

23. An apparatus for reducing the bit-rate of original image data into coded image data, and for reconstructing said coded image data into output image data, said original image data comprising an original color component comprising a first plurality of N-bit original pixels, said coded image data comprising a coded color component comprising a second plurality of M-bit coded pixels, said output image data comprising an output color component comprising a third plurality of N'-bit output pixels, the possible range of each of said N-bit input pixels consisting of a plurality of equally sized contiguous intervals, the number of said intervals determined by M, said apparatus comprising:

a first memory for storing said original image data;

a second memory for storing a threshold array, said threshold array comprising a fourth plurality of threshold pixels;

a processor coupled to said first and second memory, and to a third memory, said processor for pixel-wise generating a corresponding coded pixel in said second plurality for each original pixel in said first plurality until said second plurality is determined, said pixel-wise generation comprising the steps of:
  (i) determining an interval in said plurality of intervals, and an offset in said interval, for said original pixel; and
  (ii) generating said coded pixel for said original pixel, said coded pixel determined by said interval and by said offset and by the value of a threshold pixel in said fourth plurality, the location of said threshold pixel in said fourth plurality determined by the location of said original pixel in said first plurality;

said third memory for storing an array of said second plurality of coded pixels;

a selector coupled to said third memory, said selector for selecting a coded pixel from said array of said second plurality of coded pixels;

a reconstructor coupled to said selector and to said second memory, said reconstructor for generating a correction value for said selected coded pixel, said correction value determined by the code of said selected coded pixel and by the value of a corresponding threshold pixel of said fourth plurality, the location of said corresponding threshold pixel determined by the location of said selected coded pixel in said threshold array, said reconstructor further for applying said correction value to said selected coded pixel to produce an output pixel of said third plurality.

24. The apparatus of claim 23 wherein said original image data further comprises a plurality of said original color components, said coded image data further comprises a plurality of corresponding said coded color components, and said output image data further comprises a plurality of corresponding said output color components, each original color component having a corresponding threshold array in a plurality of threshold arrays, said pixel-wise generation applied to each original color component, and said selection of said coded pixel, generation of a correction value for said selected coded pixel, and said application of said correction value to said selected coded pixel are all applied to each corresponding coded color component.

* * * * *